March 22, 1938.   R. N. FALGE   2,111,585
HEAD LAMP TESTING APPARATUS
Filed July 17, 1935   5 Sheets-Sheet 1
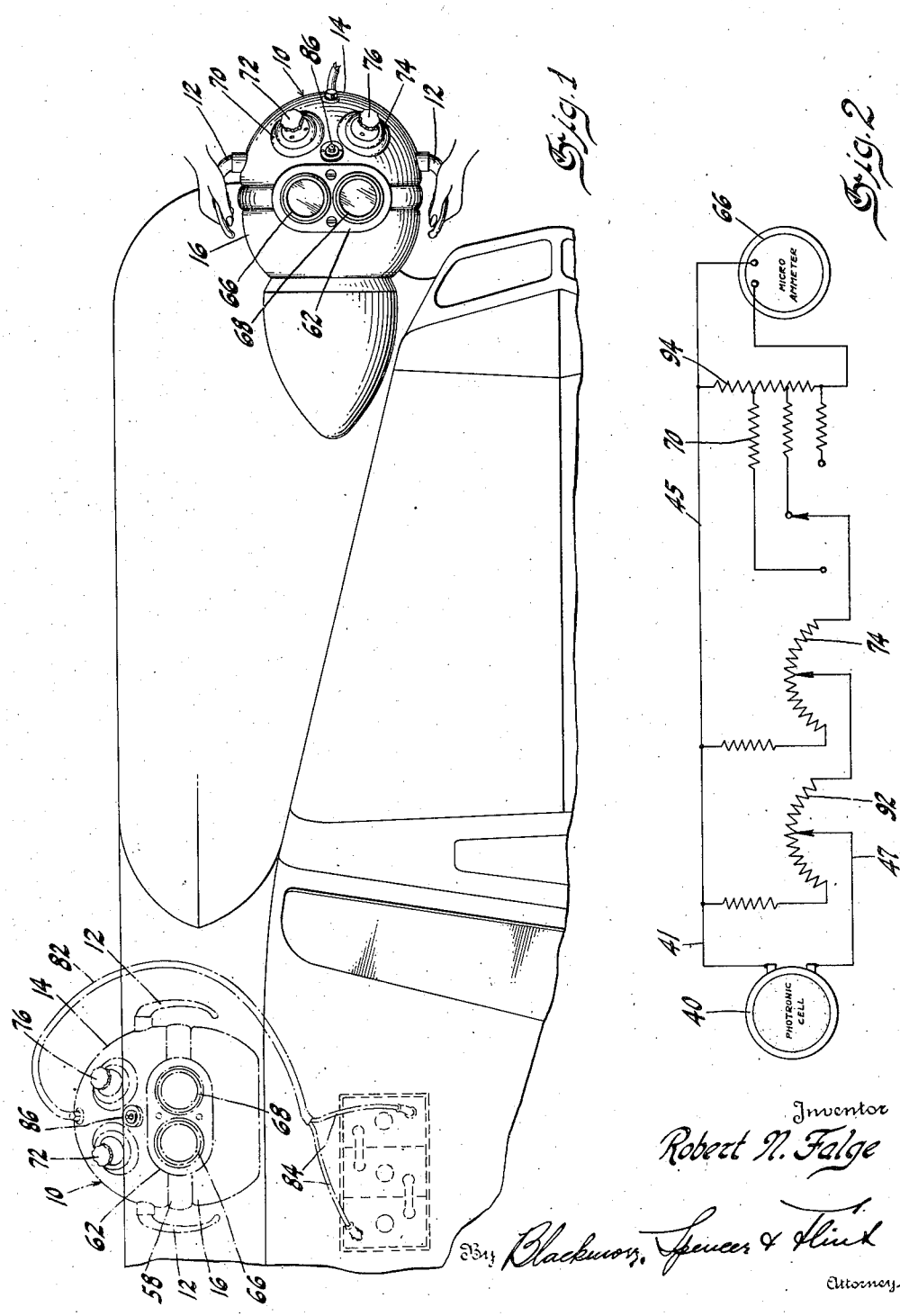
Inventor
Robert N. Falge

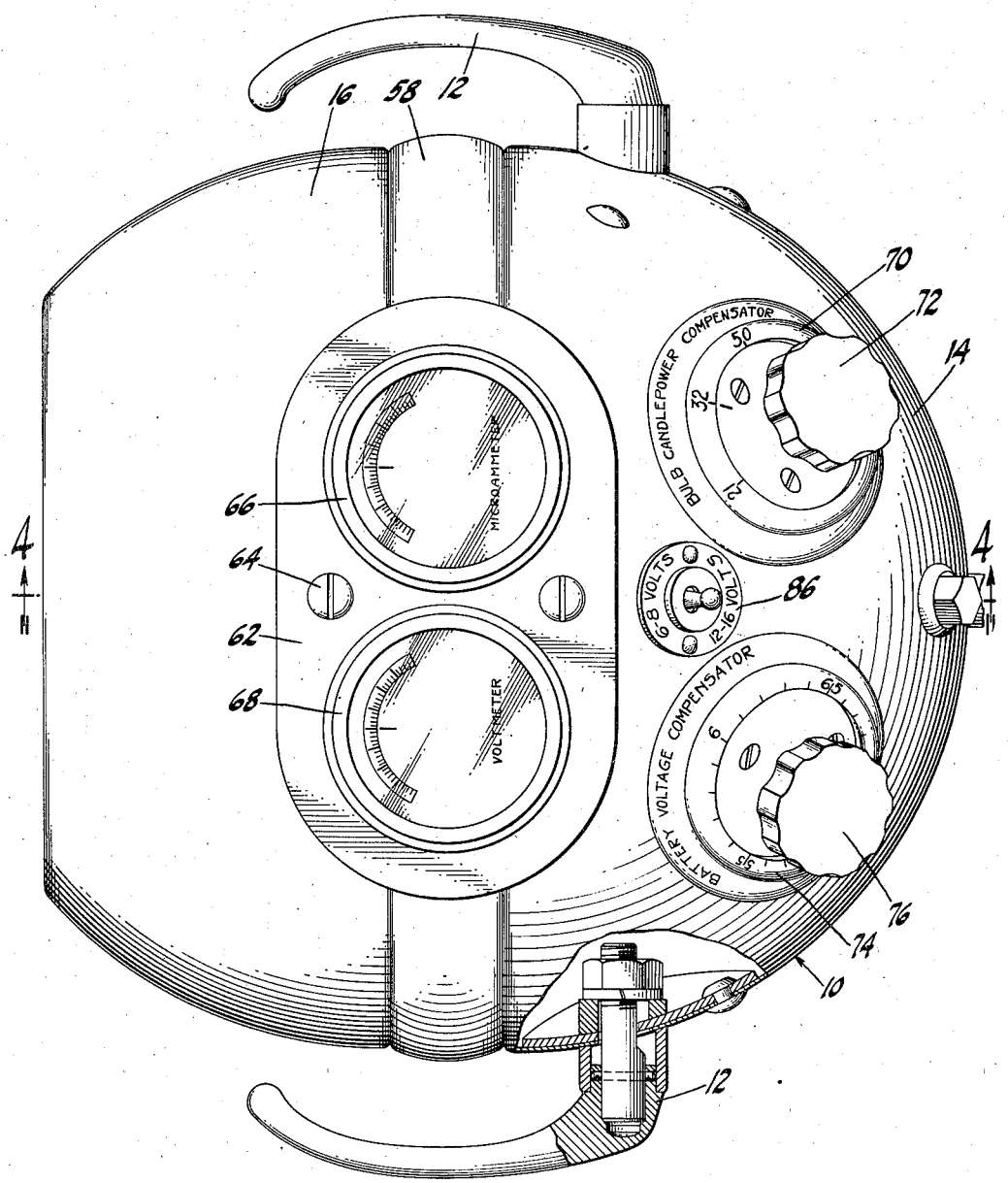

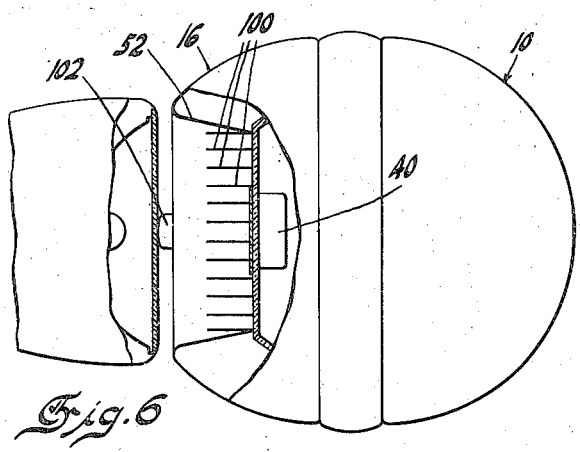
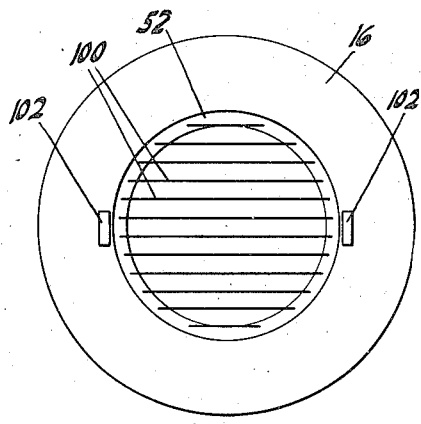
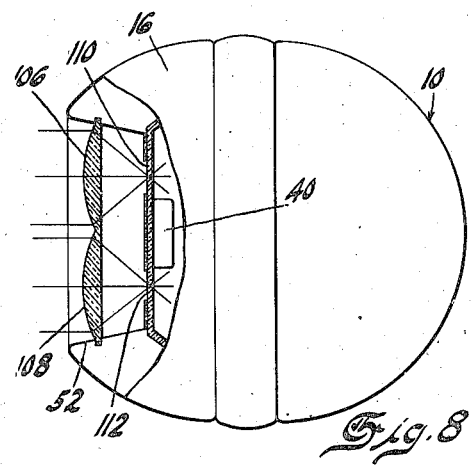
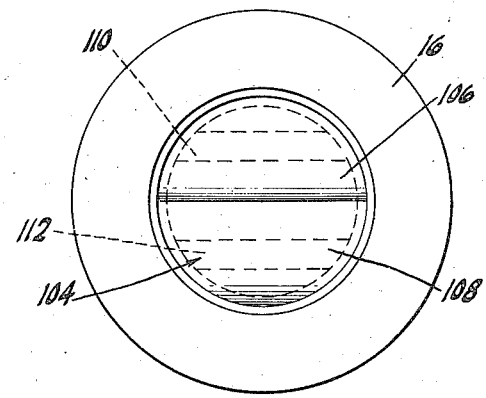
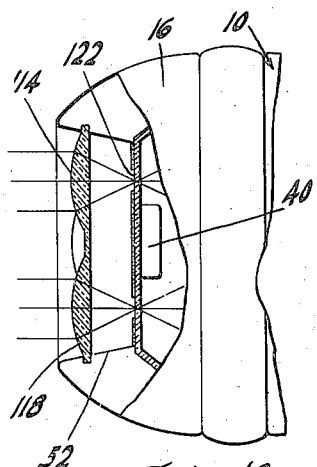
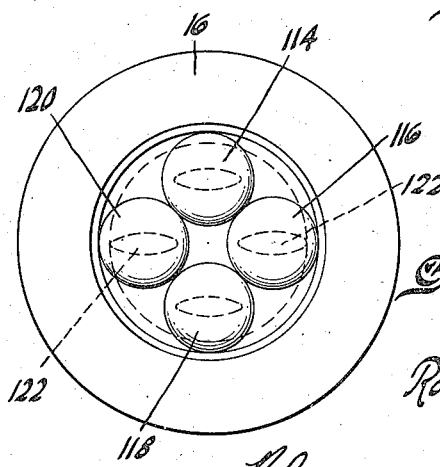

Patented Mar. 22, 1938

2,111,585

UNITED STATES PATENT OFFICE 2,111,585

HEAD LAMP TESTING APPARATUS

Robert N. Falge, Anderson, Ind., assignor to General Motors Corporation, Detroit, Mich., a corporation of Delaware Application July 17, 1935, Serial No. 31,759

6 Claims. (Cl. 88—23)

This invention has to do with equipment adapted for use in service stations to check the light output of automobile headlamps and the like. Such devices provide a means for measuring the efficiency of lighting equipment, aid in correcting defects, and finally afford a means to demonstrate to the customer that defects have been eliminated.

The device consists essentially of means to receive the light from the headlamp and project it upon a light measuring instrument, preferably a photronic cell combined with a suitable indicator such as a microammeter. To accomplish this, there is provided a housing having an opening adapted to be placed against the headlamp lens so that the light from the lamp is cast upon a reflector within the housing and by the reflector converged on the sensitive element of the photoelectric cell. It is preferable to provide for diffusion of the light so as to eliminate streaks and shadows in the pattern projected on the cell element. This may be accomplished in a simple manner by providing a diffusing lens in front of the reflector. The light sensitive cell may be conveniently mounted on the lens with its light receiving element facing the reflector.

A simple reading of headlight output with the use of such a device would, however, not give a reliable indication of the condition of the lamp and electrical system, owing, primarily, to the fact that the light output varies with the voltage of the battery supplying current to the headlamp bulb. The battery voltage varies widely during the operation of the automobile. Tests indicate that upon driving into a service station, after a run on the road, the average light output is as much as 30% higher than it is after the car has stood a few hours in the garage. This change in battery voltage is believed to be due to the gradual dissipation of the gas evolved during the charging which took place on the road. If, therefore, the headlamp output is measured when the car enters the service station, then measured again several hours later when the owner calls for it after the service operation has been completed, the reduction in light output due to reduced voltage might easily be sufficient to offset the increase resulting from service. To overcome this error, I have provided a rheostat either in series or in parallel but, preferably in series-parallel with the light sensitive cell, to compensate for battery voltage changes by changing the current going to the indicating ammeter in corresponding amount.

In order to keep the operator continuously informed as to the battery voltage and enable him to change the setting of the battery voltage compensator as needed, I have preferred to incorporate in my device a voltmeter which may readily be coupled to the battery terminals. I also prefer to use a 7 volt voltmeter range, with a two-way switch to properly reduce the reading when used on a 12–16 volt system.

In service, there will be encountered headlamps equipped with bulbs of different candle power, and to care for this condition, I have preferably provided a second compensator in the form of a variable resistance, preferably in series-parallel, to modify the current going through the ammeter in such manner as to provide the same reading for all bulb candle powers.

In the present state of development of light sensitive cells, it has been found desirable to provide an additional rheostat to compensate for variations in cell output and in the optical parts of the device, and this rheostat may likewise be arranged in the circuit in the same manner as the ones previously described. If desired, another variable rheostat, similar to the battery voltage compensator rheostat, may be incorporated to correct the readings for all makes and sizes of lamps to a specific value on the microammeter, thereby permitting the latter to be calibrated in terms of "good," "fair," "poor," etc. This calls for a much more sensitive microammeter.

Figure 1 is a top plan view showing at the left the use of the device for measuring battery voltage, and at the right the use of the device in measuring the output of a headlamp.

Figure 2 illustrates the preferred form of circuit for the headlight output testing.

Figure 3 is a top plan view of the device on an enlarged scale.

Figure 4:
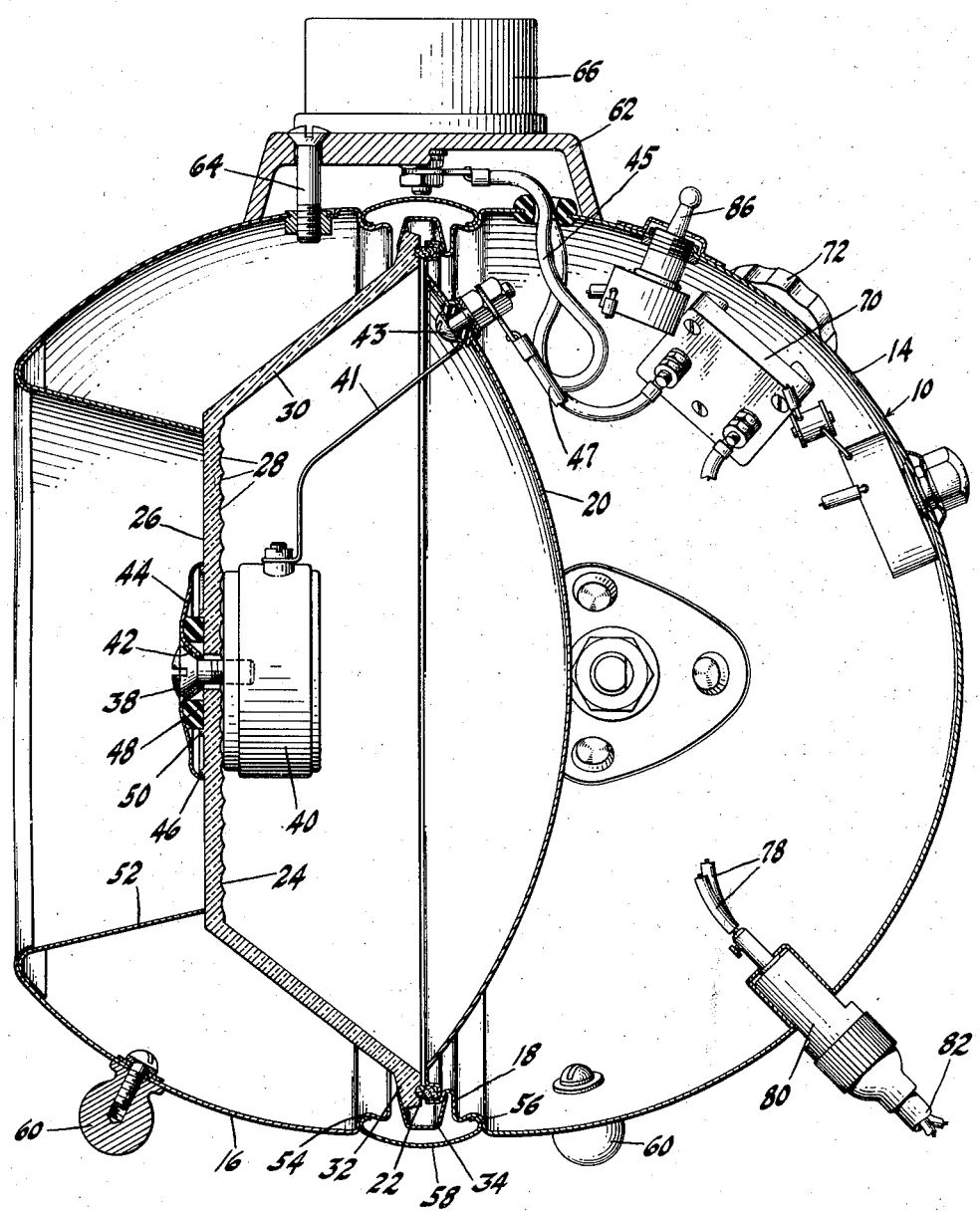
Figure 4 is a section on line 4—4 of Figure 3.

Figures 6–11, inclusive, show schematic side and front views of three different modified forms of my invention.

Referring now to Figures 3, 4 and 5, 10 indicates a housing provided at opposite sides with handles 12 for convenience in holding it in position to receive the light from the headlamp as is clearly shown in Figure 1. The housing 10 preferably consists of a rear portion 14 and a front portion 16. The portion 14 has its forward edge inturned as indicated at 18 to provide a seat for a reflector 20 which may be parabolic in shape equipped with the usual sealing gasket 22. Over the reflector is placed a lens 24 having a forward flat portion 26 provided with horizontal light diffusing flutes 28 and connected by conical portion 30 with a rim 32 which is preferably grooved to receive the gasket 22. A clamping band 34 is provided so that by manipulation of screw 36 connecting the ends of the band, the lens may be clamped to the reflector and the reflector clamped to the housing portion 14. The portion 26 of the lens is preferably centrally apertured to receive screw bolt 38 which is threaded into the housing of the photoelectric cell 40. The head of the screw bolt is preferably received in a conical socket 42 formed in stamped cup 44 which is centered on the lens by the engagement of its flanged edge with a rib 46 integral with the lens. Gasket 48 is interposed between the cup 44 and the lens, and is likewise preferably centered by engagement with a similar rib 50. The photoelectric cell 40 is provided with a pair of leads, one of which is shown at 41 in Figure 4, going to insulated terminals 43 mounted in the reflector 20. To one of the terminals is secured lead 45 going to the microammeter 66. The other lead 47 is connected to one of the compensators hereinafter described and shown on Figures 2 and 5.

16 indicates the forward portion of the housing which is provided with an inturned lip or flange 52 engaging the portion 26 of the lens. The rear edge of the portion 16 is provided with a groove 54 and the forward edge of the portion 14 is provided with a corresponding groove 56 to receive a second clamping band 58 which may be drawn tight by manipulation of screw 61 to secure the two parts of the housing together.

The bottom of the housing 10 may be conveniently provided with supports 60 to permit standing it in upright position.

Figure 5:
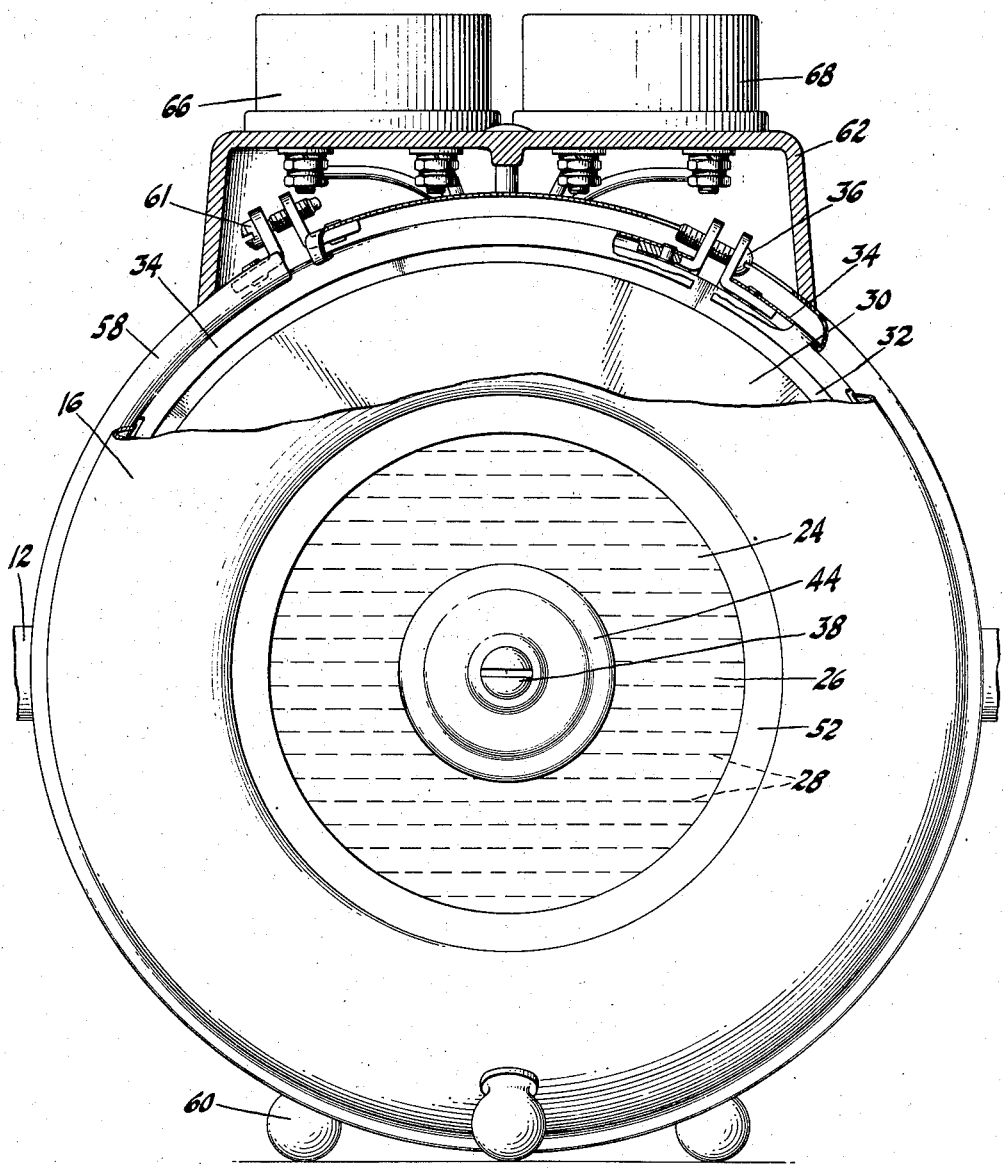
Figure 5 is a front view of the device.

For convenience, the indicating instruments are preferably mounted on a support 62 secured to the top of the housing 10 as by screw bolts 64. The housing 62, as best shown in Figure 5, is preferably designed to cover and conceal the tightening bolts 36 and 61 for the clamping bands. The microammeter is indicated at 66 and the voltmeter at 68, both being suitably clamped to the support 62.

There are also mounted at the top of the section 14 suitable compensators for adjusting the flow of current to the microammeter to care for variations in bulb candle power and battery voltage. These may take the form of conventional rheostats. 70 indicates the bulb candle power compensator provided with the operating knob 72, and preferably calibrated for adjustment in three steps to care for conventional bulbs of 21 candle power, 32 candle power, and 50 candle power. 74 indicates the battery voltage compensator consisting of a rheostat having the usual operating knob 76.

The voltmeter 68 is provided with leads 78 going to detachable connector 80 which, as shown at the left of Figure 1, is provided with cable 82 having branched leads 84 adapted for connection with the battery terminals. In one of the leads 78 there is arranged the voltmeter switch 86 which either inserts resistance in the circuit or shorts it out. The switch 86 is best shown in Figure 3, and is a simple two position switch. When it is in the position marked 6-8 volts, no resistance is inserted in the circuit, but when in the position marked 12-16 volts, suitable resistance is inserted to adapt the voltmeter for measuring the higher voltages. The voltmeter and its connections constitute a complete circuit separate from that of the output indicator.

Figure 2 shows the circuit of the output indicator. The microammeter 66 is in series with the light sensitive element of the cell 40. 92 indicates a resistance arranged as shown with an adjustable contact so as to be partly in series with the light sensitive cell 40 and partly in parallel with it. This compensator will be adjusted initially at the factory for the particular optical combination and cell used in the device, and may, if preferred, be mounted in the casing of the cell. The battery voltage compensator 74 consists of a rheostat with an adjustable contact arranged just like the rheostat 92, partly in series, and partly in parallel with the cell 40.

The bulb candle power compensator 70 preferably takes the form of a resistance 94 from which extend resistances leading to the contacts of the compensator to compensate for the various candle power bulbs as indicated on the wiring diagram. It will be noted that the compensating rheostat 70 is arranged in substantially the same manner as the compensating rheostats 74 and 92 in that it is partly in shunt and partly in series with the light sensitive cell. The series-parallel arrangement is desirable because of the fact that the type of cell used, preferably a Weston photronic cell, is a generator of current of substantial value, and the current flow can best be controlled by shunting some of it around the indicating ammeter.

In the operation of the device, the battery voltage will first be measured as shown at the left of Figure 1, and then the battery voltage compensator 74 will be adjusted for the same value on its scale. The bulb candle power compensator will then be set to correspond to the rating of the bulb in the lamp, and the device will be placed over the lamp as shown in Figure 1, and manipulated sideways and up and down until the ammeter reading is a maximum. This has the added advantage that it consumes a little time and permits the cell to settle down. By comparing the reading thus obtained with the amount that the reading should be for a properly adjusted headlamp, the service man will be able to advise the car owner whether his headlamps are giving all the light they should or not, and, if not, he will, by changing bulbs, replacing the reflector, or otherwise servicing the lamp, be able to improve the light output.

I prefer to locate the plane of the active element in the cell in the focal plane of the reflector in order to reduce the size of the image projected on the active element to a minimum. Then, as the filament in the headlamp is located ahead or behind focus, due to unavoidable manufacturing variations in fixed-focus headlamps, the maximum size of the image on the cell will be a minimum. This permits the opening in the shield over the cell to be reduced to a minimum to exclude as much of the diffused light from dirty reflectors as possible. The white scum on a dirty reflector is a fairly efficient reflector and it is desirable to exclude the diffused rays. The semidiffused rays, emitted at angles close to those of the reflected rays from a clean reflector, offer the biggest problem. Consequently, it is desirable to concentrate the light into the smallest possible area on the cell and surround it with the smallest possible shield opening.

I prefer horizontal flutes on the output meter lens to spread the rays vertically to smooth up up the beam pattern. These, in combination with the vertical flutes on the ordinary headlamp lens, which spread the light horizontally, cooperate to produce a substantially rectangular beam pattern. Flutes, other than horizontal, on the output meter lens, do a fair job, but horizontal flutes function best.

I prefer a rectangular aperture in the shield over the cell, with its axes horizontal and vertical, to cooperate with the rectangular shape of the beam pattern. Then, as the pattern moves up, down, or sideways, due to inaccuracies in filament location in the headlamp reflector, such streaks and shadows as may still remain in the pattern will not be cut off gradually as they approach the extremes of the aperture, as would be the case if the aperture was round, for example.

I prefer an aperture which is longer, up and down, than sideways. The sideways dimension is less because it needs only to accommodate sideways manufacturing errors in filament location in the headlamp. The up and down dimension is larger because, in addition to these manufacturing errors, it must accommodate the substantial displacement up and down of the pattern on the cell in changing from the upper to the lower filament in a two-filament headlamp.

I prefer a reflector of relatively long focal length in order to intercept light from a circle of reasonable size on the headlamp lens as limited by cone 52, and direct it to the cell element at a fair angle. This is particularly desirable in the case of commercial photronic cells available on the market which incorporate a raised rim around the outer edge of the element which intercepts rays entering at the wider angles. Furthermore, light at extreme angles is likely to introduce an error because more of its its reflected from the glass which protects the cell element. The net result of efforts to use rays at too wide an angle was to reduce the lamp reading when the filament was behind focus.

I prefer to locate the plane of the lens in the output meter close to the plane of the active element in the cell so that less of the light spread by the lens will be intercepted by the cell case. This introduces an error and suggests the desirability of a cell smaller in diameter than those commercially available.

I prefer to locate the output meter lens at a distance of several inches from a flat headlamp lens such that when the device is placed over a heavily convex lens, it will fit inside the output meter body and the distance from the reflector in the headlamp to the cell in the meter will be more nearly constant.

I prefer to provide a reflector and face the cell away from the headlamp, rather than interpose a diffusing glass between the cell and the headlamp, as a means for increasing the distance between the cell and the headlamp without unduly increasing the overall length of the output meter.

I have found that the range of variation between readings for headlamp reflectors of different diameter and focal length, and for head lamp lenses of different degrees of convexity, increases as the distance which the light must travel from headlamp to cell decreases. Minimum range of readings for different lamps is desirable as a means for permitting larger graduations on the microammeter scale and, thereby, increasing accuracy in reading a scale of given size. Minimum range also permits the classification of headlamps into fewer groups and, thereby, simplifies the rating table which must accompany the device.

I prefer a chrome plated reflector and a rubber gasket in order to minimize loss of efficiency with time.

I prefer a relatively efficient type of optical system such that reduced cell output due to lenses which diffuse the light, minimum aperture size in the mask, minimum cell size, low efficiency chrome plated reflectors, and similar desirable features will still result in the generation of sufficient electrical energy in the cell to accommodate a microammeter of low enough sensitivity to avoid unnecessary fragility and excessive cost.

One of the difficulties encountered in practice where a diffusing reflector is used in place of a specular reflector such as has been previously described is that it reads specularly reflected light and diffused light with equal facility. The white scum which sometimes collects on the headlamp reflector reflects a certain amount of diffused light which it is desirable to reject in getting a true reading of relative beam candle power. Horizontal, flat-black louvers may be added in front of the output meter lens, as shown in Figures 6 and 7. In these two views the front portion of the meter has a series of horizontal, flat louvers 100, which are supported in the beveled front portion of the casing. These louvers absorb some of the diffused light and limit the angularity range upon which the light beams may enter the front of the meter. This has the disadvantage that the output meter must be rocked up and down when taking a reading, possibly around pads such as 102 resting against the headlamp lens, as shown, as well as moved around over the lamp face, to get a maximum reading. It also introduces minor errors when the filament in the headlamp is out of focus, and in reading the lower beam which comes from a filament displaced substantially above the focus. The maximum reading will result, of course, when all rays emanate with their axes parallel.

Another possibility to reduce the effect of diffused light is to intercept the light from the headlamp with horizontal, cylindrical lenses, the structure of which is best shown in Figures 8 and 9. The concentrating lens 104 in this instance is placed in the forward portion of the bezel of the output meter and is formed of two horizontal, cylindrical sections 106 and 108 which concentrate the light vertically only through the rectangular light openings 110 and 112 of the screen structure of the meter. Unfortunately, these slots must be rather large vertically in order to accommodate variations in the angle of rays from different zones on the headlamp, the direction of the rays from which is affected by horizontal prisms on the lens or modifications in the reflector to produce a similar effect. This up-and-down slot dimension may be minimized by rocking the output meter about a horizontal axis, as shown in Figure 6.

It is obvious, of course, that where a diffusing reflector is employed a number of round or fitted plano-convex lenses might be arranged around the cell, as shown in Figures 10 and 11, in place of cylindrical lenses of 8 and 9, if desired, and in the diagram, four plano-convex lenses 114, 116, 118 and 120 are shown. In such a case, less light is intercepted by the cell case and the shield which surrounds the output meter lens, the openings through the shield being substantially oval, as shown at 122, so that the device is less sensitive to inaccuracies in filament position in the headlamp.

I claim:

1. The combination of a housing, a reflector in the housing, a lens over the reflector, means for securing the reflector and lens to the housing, an annular cowl extending over the lens and shielding a portion of it from entering light, and means for securing the annular cowl to the housing, a light sensitive device mounted on the lens and exposed to light projected from the reflector, and an indicator mounted on the housing and adapted to be operated by said device.

2. A light output indicator comprising a two-piece spherical shell casing, a reflector and a lens whose peripheries are supported adjacent the juncture of the two parts, a plurality of control means supported by one part of the casing, a light sensitive cell supported on the lens, receiving light from the reflector and controlled by the control means and indicating means on the casing connected to the control means to indicate the amount of illumination.

3. In a light output indicator, a casing, a concave reflector mounted therein, a frusto-conical lens supported over the reflector, a light sensitive element secured to the central portion of the lens at the focus of the reflector whereby the light concentrated by the reflector is directed to the element.

4. In a light output indicator, a casing, a concave reflector mounted therein, a frusto-conical lens supported over the reflector, a light sensitive element secured to the central portion of the lens at the focus of the reflector whereby the light concentrated by the reflector is directed to the element, said lens being formed to diffuse the light going to the reflector.

5. In a light output indicator, a casing, a concave reflector mounted therein, a frusto-conical lens supported over the reflector, a light sensitive element secured to the central portion of the lens at the focus of the reflector whereby the light concentrated by the reflector is directed to the element, said lens being formed to diffuse the light going to the reflector, an indicating means on the casing and connections from the cell to the indicating means.

6. In a light output indicator, a casing, a concave reflector mounted therein, a frusto-conical lens supported over the reflector, a light sensitive element secured to the central portion of the lens at the focus of the reflector whereby the light concentrated by the reflector is directed to the element, said lens being formed to diffuse the light going to the reflector, an indicating means on the casing, a control means on the casing and connections between the cell, indicating and control means.

ROBERT N. FALGE.